US009870658B1

(12) United States Patent
McWilliam et al.

(10) Patent No.: US 9,870,658 B1
(45) Date of Patent: Jan. 16, 2018

(54) SECURITY BADGE

(71) Applicant: Amazon Technologies, Inc., Seattle, WA (US)

(72) Inventors: Giles David Matthew McWilliam, San Francisco, CA (US); Steven Craig DiNoto, Kirkland, WA (US); Michael David Morris Sniderman, Seattle, WA (US); Jesse Scott Knutson, Milwaukee, WI (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/487,013

(22) Filed: Apr. 13, 2017

Related U.S. Application Data

(63) Continuation of application No. 14/935,326, filed on Nov. 6, 2015, now Pat. No. 9,652,909.

(51) Int. Cl.
*G05B 19/00* (2006.01)
*G07C 9/00* (2006.01)
*G09F 3/18* (2006.01)

(52) U.S. Cl.
CPC ......... *G07C 9/00007* (2013.01); *G09F 3/185* (2013.01)

(58) Field of Classification Search
CPC ............ B32B 2519/00; B32B 2519/02; G07C 9/00111; G09F 3/18; G09F 3/185; G09F 3/201; G09F 3/207
USPC ................ 235/492; 40/1.5–1.6, 642.02, 661; 347/224; 361/737; 340/5.6, 5.61–5.64
See application file for complete search history.

(56) References Cited

U.S. PATENT DOCUMENTS

| | | | | |
|---|---|---|---|---|
| 7,221,257 | B1 | 5/2007 | Tuttle et al. | |
| 7,584,896 | B2 | 9/2009 | Warther et al. | |
| 8,072,330 | B1 | 12/2011 | Nichols, Sr. et al. | |
| 2003/0234286 | A1 | 12/2003 | Labrec et al. | |
| 2004/0091659 | A1 | 5/2004 | Banks et al. | |
| 2008/0106413 | A1 | 5/2008 | Rohlf et al. | |
| 2008/0128493 | A1 | 6/2008 | Jones et al. | |
| 2008/0149731 | A1 | 6/2008 | Arai et al. | |
| 2008/0190784 | A1 | 8/2008 | Phillips et al. | |
| 2009/0100731 | A1 | 4/2009 | Elvin et al. | |
| 2011/0031139 | A1 * | 2/2011 | Macor | B01L 3/508 206/232 |
| 2014/0183269 | A1 | 7/2014 | Glaser et al. | |

OTHER PUBLICATIONS

U.S. Appl. No. 14/935,326 , "Non-Final Office Action", dated Sep. 23, 2016, 10 pages.
U.S. Appl. No. 14/935,326 , "Notice of Allowance", dated Jan. 17, 2017, 8 pages.
U.S. Appl. No. 14/935,326 , "Restriction Requirement", dated Aug. 4, 2016, 5 pages.

(Continued)

*Primary Examiner* — Carlos E Garcia
(74) *Attorney, Agent, or Firm* — Kilpatrick Townsend & Stockton LLP

(57) ABSTRACT

An identification device includes a radio-frequency identification (RFID) card, a base member, and a front panel. The RFID card is configured to transmit an identification number. The front panel includes a laser-markable layer. The base member and the front panel are joined to form an assembly in which the RFID card is enclosed.

17 Claims, 7 Drawing Sheets

(56) References Cited

OTHER PUBLICATIONS

U.S. Appl. No. 14/935,326 , "Supplemental Notice of Allowance", dated Mar. 28, 2017, 2 pages.
U.S. Appl. No. 14/935,326 , "U.S. Patent Application No.", Security Badge, filed Nov. 6, 2015.
U.S. Appl. No. 29/544,911 , "Identification Badge", U.S. Patent Application, filed Nov. 6, 2015.

* cited by examiner

SECURITY BADGE

CROSS REFERENCE TO RELATED APPLICATIONS

This application is a continuation of U.S. application Ser. No. 14/935,326, filed Nov. 6, 2015, and entitled "SECURITY BADGE", the contents of which are herein incorporated in its entirety.

BACKGROUND

Workplace security is important for many organizations, both private and governmental. The ability to effectively identify employees is a key part of maintaining a secure workplace. In many organizations, each employee is issued a security badge or card for use in identifying the employee. A security badge is often used by authorized employees to gain access to areas off limits to unauthorized persons. A security badge typically includes an RFID chip or other authentication mechanism in addition to visual identification data such as an employee's name, photo, title and other relevant information.

BRIEF DESCRIPTION OF THE DRAWINGS

Various embodiments in accordance with the present disclosure will be described with reference to the drawings, in which.

DETAILED DESCRIPTION

Figure 1:
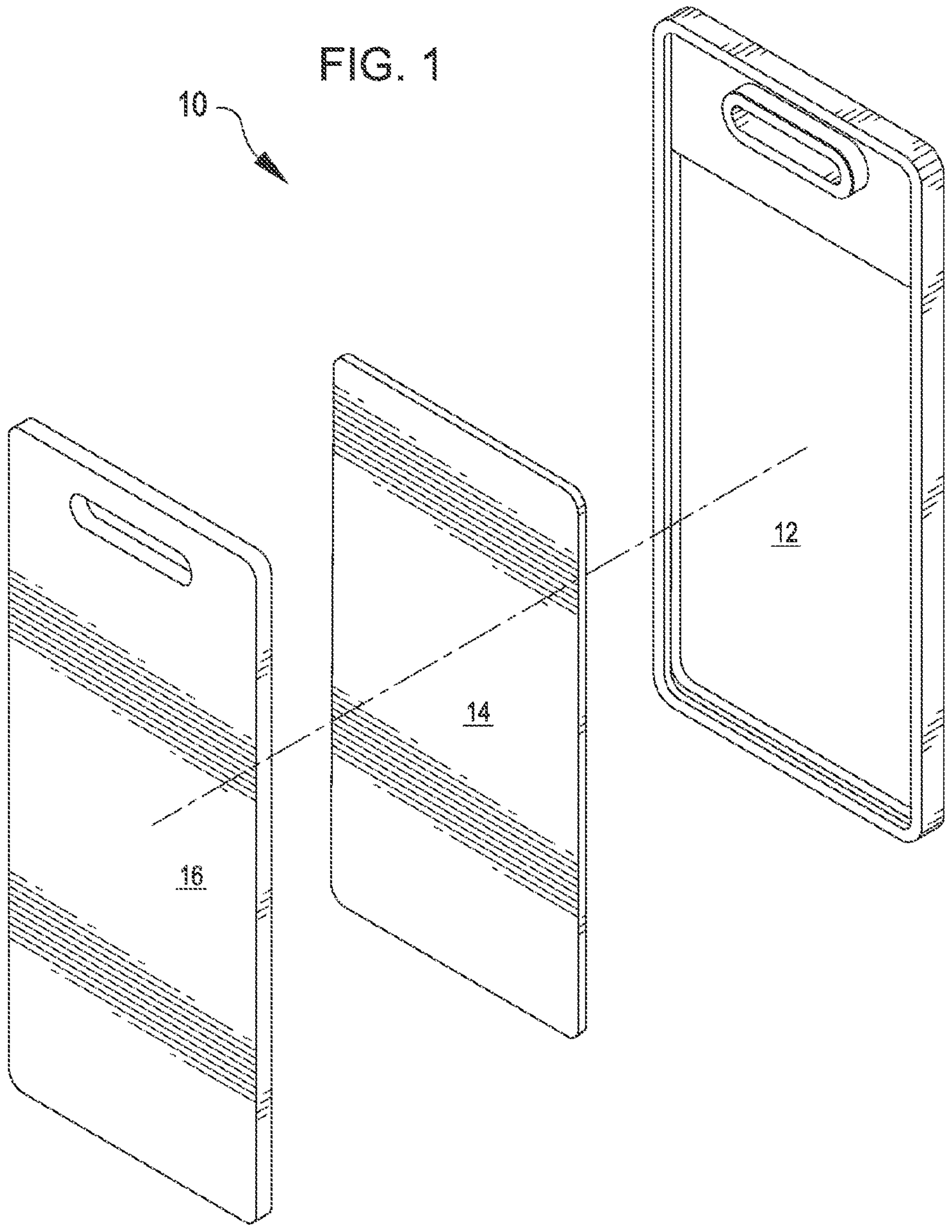
FIG. 1 is an exploded view of a security badge, in accordance with many embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An identification device (e.g., a security badge assembly) is disclosed that is laser markable and includes a radio-frequency identification (RFID) card. In many embodiments, the RFID card is disposed within a sealed compartment formed by joining a molded base member and a front panel. Alternatively, the RFID card can be molded into the base member. The molded base member can be recessed to accommodate the RFID card. In many embodiments, the molded base member is recessed to accommodate the front panel so a perimeter wall of the molded base member is externally visible. In many embodiments, the molded base has a color selected to denote an attribute of the identification device (e.g., employee tenure, employee clearance, employment group, etc.). The exposed perimeter wall, when viewed from the front of the identification device, can be seen from a distance so that the attribute of the identification device can be determined from a distance even when the back of the identification device is not visible (e.g., when disposed flat against a person carrying the identification device). The RFID card has a unique identifier to uniquely identify the identification device (e.g., to identify an employee to which the identification device is assigned). In many embodiments, the front panel includes a marked or otherwise visually differentiated bottom layer, a transparent top layer, and a laser-markable layer disposed between the bottom layer and the transparent top layer. The marked or visually differentiated bottom layer is identifiable to enable easy determination of which side of the front panel to place up during assembly of the front panel with the molded base so that the laser-markable layer will be properly oriented for subsequent laser marking of the laser-markable layer. In many embodiments, the front panel is configured to be marked via a marking laser so that a greyscale image (e.g., employee name, photo, title and other relevant information) can be marked in the laser-markable layer via a reverse-print process. The transparent top layer can serve to protect the laser-markable layer and, in many embodiments, is scratch resistant. In many embodiments, the transparent top layer has a high gloss finish to enhance contrast to, for example, make the laser-marked image background appear a deep, rich black and provide enhanced levels of contrast between black and white.

The identification device can be used in any suitable application. For example, in example embodiments described herein, the identification device is used as a security badge. An example security badge described herein includes a base member, a radio-frequency identification (RFID) card, and a front panel. The RFID card is configured to transmit an employee identification number. The front panel can include a single laser-markable layer or can include layers in addition to the laser-markable layer. For example, in many embodiments, the front panel includes a bottom layer and a laser-markable layer. The base member has a back panel and a perimeter wall extending transverse from the back panel. In many embodiments, the base member forms a recess accommodating the front panel. In many embodiments, the recess also accommodates the RFID card. The base member can be joined to the front panel to form a sealed interior compartment in which the RFID card is disposed. Alternatively, the RFID card can be molded into the molded base layer.

Any suitable RFID card can be included in the security badge. For example, in many embodiments of the security badge, the RFID card is configured to be read at each of two different frequencies (e.g., 125 KHz and 13.56 MHz).

In many embodiments, the security badge is configured to be marked via a reverse-print process. For example, in many embodiments of the security badge, the laser-markable layer is white prior to laser marking and is configured to be marked black via a marking laser so that a greyscale image can be marked in the laser-markable layer via a reverse-print process.

In many embodiments, the security badge is configured so that the color of the base member is visible from a distance even when the back of the base member is not visible (e.g., the back of the base member is flat against the employee). For example, in many embodiments of the security badge, the base member includes a perimeter wall that forms a recess accommodating the front panel so that the perimeter wall covers a perimeter surface of the front panel and is externally visible. Accordingly, color coding of the base member can be used for any suitable purpose, such as denoting any suitable attribute of the security badge (e.g., employee tenure, clearance, employment group, etc.).

In many embodiments, the security badge is configured to be suspended from a lanyard. For example, in many embodiments, the base member forms a base member aperture configured to interface with a lanyard to suspend the security badge from the lanyard. The front panel can have a front panel aperture configured to accommodate a portion of the base member that defines a portion of the base member aperture and covers a surface of the front panel aperture.

The base member and the front panel can be made from similar materials. For example, each of the base member and the bottom layer of the front panel can be made from a polycarbonate material. In such embodiments of the security badge, the perimeter wall of the base member and a perimeter portion of the front panel can be joined via ultrasonic welding.

In another aspect, a method for manufacturing an identification device includes forming a base member from a radio-frequency permeable material. The base member has a back panel and a perimeter wall extending transverse from the back panel. The base member forms a recess configured to accommodate a front panel that includes a laser-markable layer so that the perimeter wall covers a perimeter surface of the front panel. The front panel is placed into the recess. The front panel and the base member are joined to produce an assembly in which a radio-frequency identification (RFID) card configured to transmit an identification number is enclosed within a sealed compartment formed by the front panel and the base member or is at least partially encapsulated within the base member. An image is laser marked in the laser-markable layer.

In many embodiments of the method, the base member and a bottom layer of the front panel are formed from similar materials to facilitate joining of the base member and the front panel. For example, forming the base member can include molding the base member from a polycarbonate material. The bottom layer of the front panel can be formed from a polycarbonate material. Joining the front panel and the base member can include ultrasonically welding a perimeter portion of the bottom layer of the front panel to the perimeter wall of the base member.

In many embodiments, the method includes marking an image into the laser-markable layer via a reverse-print process. For example, the laser-markable layer can be white prior to laser marking. Laser marking the image can include laser marking black marks into the laser-markable layer to form a greyscale image in the laser-markable layer via a reverse-print process.

In many embodiments of the method, the identification device is manufactured so that a perimeter wall of the base member is visible even if the back of the base member is not visible (e.g., the base member is disposed flat against a person carrying the identification device). For example, forming the base member can include forming a recess configured to accommodate the front panel so that the perimeter wall covers a perimeter surface of the front panel and is externally visible. Accordingly, color coding of the base member can be used to denote any suitable attribute of the identification device (e.g., employee tenure, clearance, employment group, etc.).

In many embodiments of the method, the identification device is manufactured to include a lanyard aperture. For example, forming the base member can include forming a base member aperture configured to interface with a lanyard to suspend the identification device from the lanyard. The method can include accommodating a portion of the base member that defines a portion of the base member aperture within an aperture in the front panel.

Turning now to the drawings in which like reference numbers denote like elements through the various figures, FIG. 1 is an exploded view of an identification device (e.g., security badge 10), in accordance with many embodiments. The security badge 10 includes base member 12, a radio-frequency identification (RFID) card 14, and a front panel 16. In the illustrated embodiment, the base member 12 and the front panel 16 are configured to be interfaced and joined so as to form an enclosed compartment in which the RFID card 14 is enclosed. The front panel 16 is configured to be laser-markable so that an image (e.g., employee name, photo, title and other relevant information) can be marked in the front panel 16.

The RFID card 14 can have any suitable configuration. For example, in many embodiments the RFID card 14 is an integrated dual-coil RFID Smart Card Assembly that is readable via two different frequencies (e.g., 125 KHz and 13.56 MHz) and configured to transmit an employee identification number.

Figure 2:
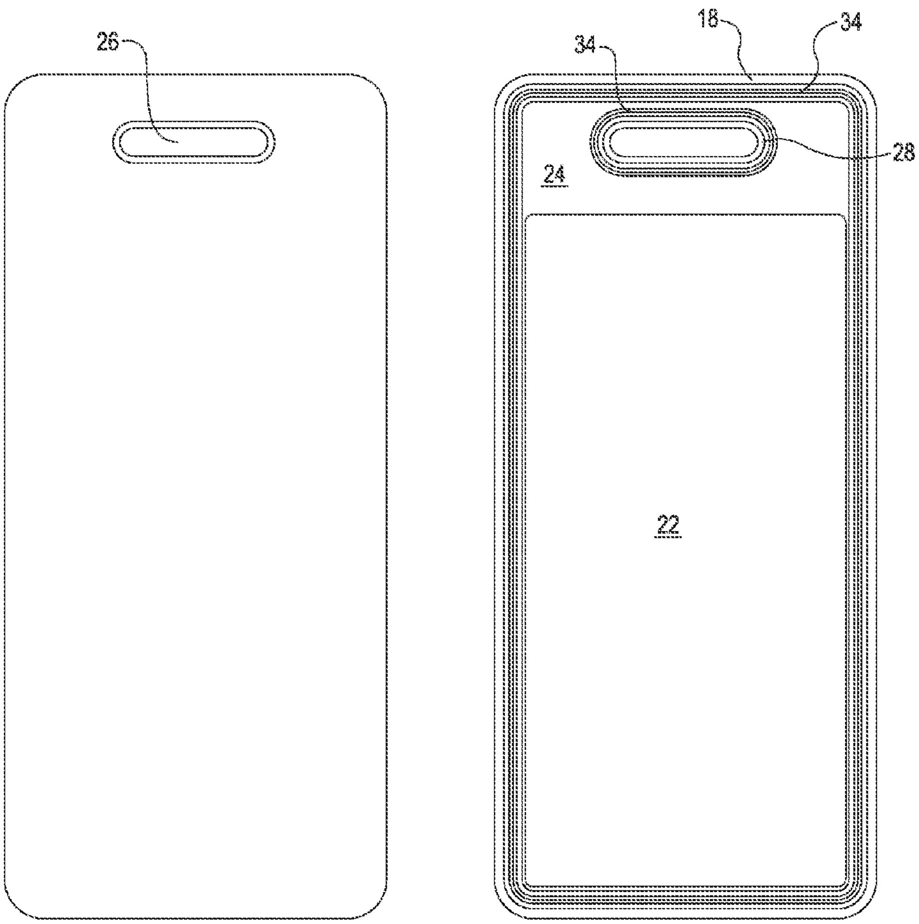
FIG. 2 shows front views of a molded blank for a base member of the security badge of FIG. 1 and the base member fabricated from the molded blank.

The base member 12 can be made from any suitable, preferably radio-frequency permeable material, and fabricated using any suitable approach. As an example, the base member 12 can be molded from a suitable material (e.g., Bayer Makrolon 2407 polycarbonate). FIG. 2 illustrates details of an embodiment of the base member 12. In the illustrated embodiment, the base member 12 is formed via injection molding. The lanyard aperture 26 and other surfaces of the base member 12 can be molded into the base member 12. For example, in the illustrated embodiment, the base member 12 is molded so as to produce as molded interior surfaces corresponding to the thinner area 22, the thicker area 24, and a perimeter welding element 34.

Figure 3:
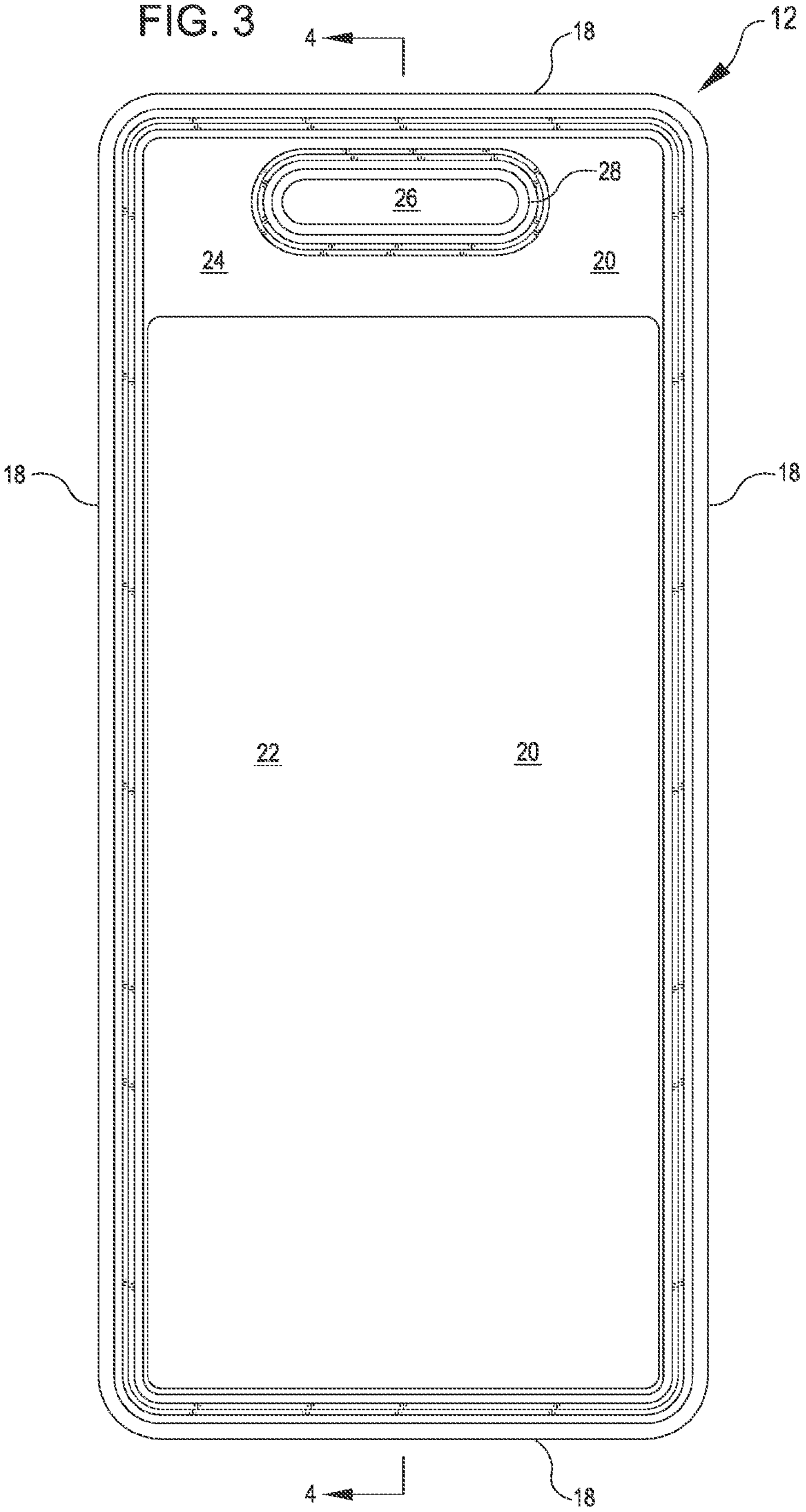
FIG. 3 show a front view of the base member of the security badge of FIG. 1.

FIGS. 2 and 3 include front views of a base member 12. The base member 12 includes a perimeter wall 18 that extends substantially perpendicular to a back wall 20 of the base member 12. The exposed back external surface of the base member 12 is planar. The back wall 20 includes a thinner area 22 and a thicker area 24. The difference in thickness between the thicker area 24 and the thinner area 22 forms a localized recess sized to accommodate the RFID card 14. For example, the thickness of the RFID card 14 can be equal to or less than the difference in thickness between the thicker area 24 and the thinner area 22. The thicker area 24 extends around the thinner area 22 so as to form a support surface for the front panel 16 that extends around the perimeter of the base member 12 and interfaces with the perimeter of the front panel 16. The perimeter wall 18 extends from the back wall 20*a* distance greater than the thickness of the thicker area 24 so as to accommodate the front panel 16. For example, in the illustrated embodiment, the perimeter wall 18 extends from the back wall 20 to a distance beyond the top surface of the thicker area 24 by a distance equal to the thickness of the front panel 16, thereby placing the top exposed external surface of the front panel 16 flush with the top surface of the perimeter wall 18. The base member 12 further includes a lanyard aperture 26 configured to accommodate a lanyard used to suspend the security badge 10. In the illustrated embodiment, the lanyard aperture 26 is partially defined by a lanyard aperture wall 28 that extends substantially perpendicular from the thicker area 24 of the back wall 20 by a distance equal to the thickness of the front panel 16, thereby placing the top exposed external surface of the panel 16 flush with the top surface of the lanyard aperture wall 28.

Figure 4:
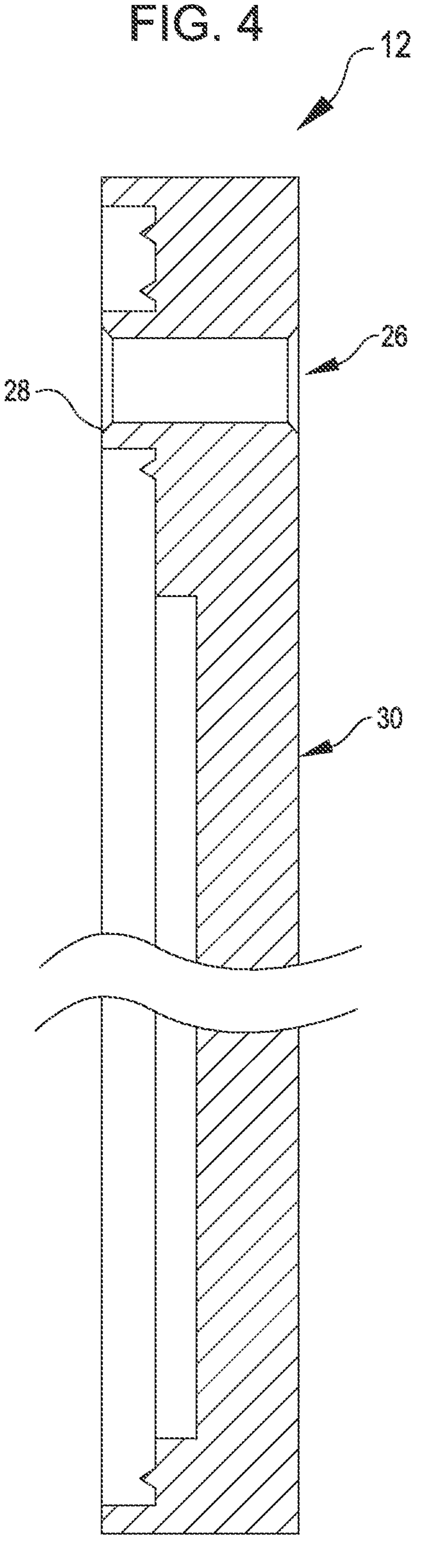
FIG. 4 is a cross-sectional view of the base member of FIG. 3.

FIG. 4 shows a cross-sectional view of the base member 12 corresponding to cross-sectional indicators 4-4 shown in FIG. 3. The base member 12 has a planar back surface 30. The thinner area 22 of the back panel 20 extends a length and a width to accommodate the RFID card 14. The thicker area 24 extends a length and a width to accommodate the front panel 16. The lanyard aperture 26 extends through the base member 12 from the back surface 30 to the top surface of the lanyard aperture wall 28. The lanyard aperture 26 is shaped (e.g., chamfered) so as to not have any sharp edges to reduce or eliminate fraying of a lanyard and to better accommodate sliding of the lanyard within the lanyard aperture 26.

Figure 5:
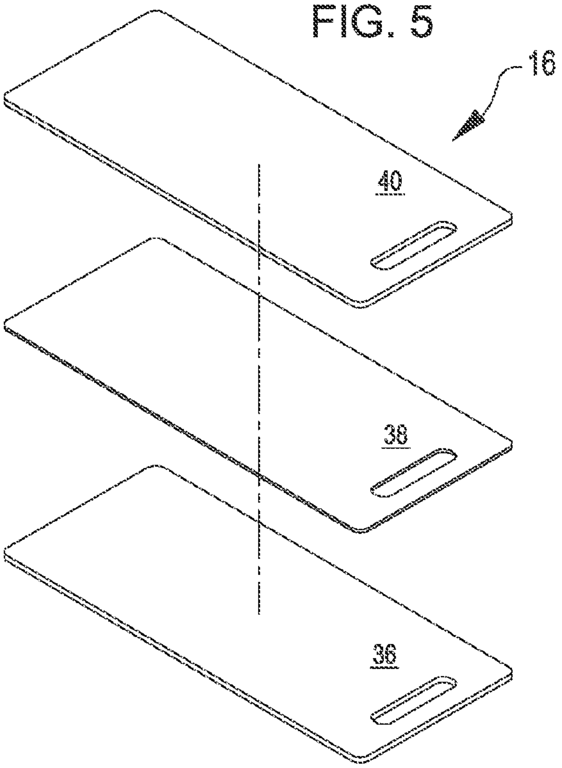
FIG. 5 is an exploded view of a front panel of the security badge of FIG. 1.

FIG. 5 is an exploded view of an embodiment of the front panel 16 of the security badge 10. In the illustrated embodiment, the front panel 16 includes a marked or otherwise visually differentiated base layer 36, a laser-markable layer 38, an a clear top coat layer 40. In many embodiments, the base layer 36 provides structural rigidity and provides a surface onto which the laser-markable layer 38 is laminated. The base layer 36 can have any suitable color (e.g., black or other non-white color) and/or marking to provide a visual indication as to which side of the front panel 16 is oriented upward during assembly with the base member 12 to ensure proper orientation of the laser-markable layer 38 for subsequent laser marking. In many embodiments, the laser-markable layer 38 includes a co-extruded laser-markable film that is white in its unmarked form and is opaque such that the base layer 36 cannot be seen through the laser-markable layer 38. In many embodiments, the laser-markable layer 38 includes a white layer and a clear laser-markable layer above it. In many embodiments, the clear laser-markable layer turns black when exposed to laser energy. The transparent top layer 40 can have a suitable level of scratch resistance and/or protect the laser-markable layer 38 from incidental damage. In many embodiments, the transparent top layer has a high gloss finish to enhance contrast to, for example, make the background appear a deep, rich black and provide enhanced levels of contrast between black and white. Any suitable materials can be used to form the solid color base layer 36, the laser-markable layer 38, and the transparent top layer 40. For example, the solid color base layer 36 can be made from a suitable polycarbonate material. The laser-markable layer 38 can be formed from a suitable laser-markable film such as SABIC Lexan Polycarbonate SDCX50. The transparent top layer 40 can be made from a suitable clear material such as SABIC Lexan Polycarbonate SD8B14. In many embodiments, the transparent top layer 40 has a glossy finish to enhance visibility of the underlying layers including any image(s) marked in the laser-markable layer 38 and any remaining visible portion of the bottom white layer of the laser-markable layer 38. While the illustrated embodiment includes the above-described layers, the front panel 16 can consist of just the laser-markable layer 38 or any suitable combination of the laser-markable layer 38, and the base layer 36 and/or the transparent top layer 40.

Figure 6:
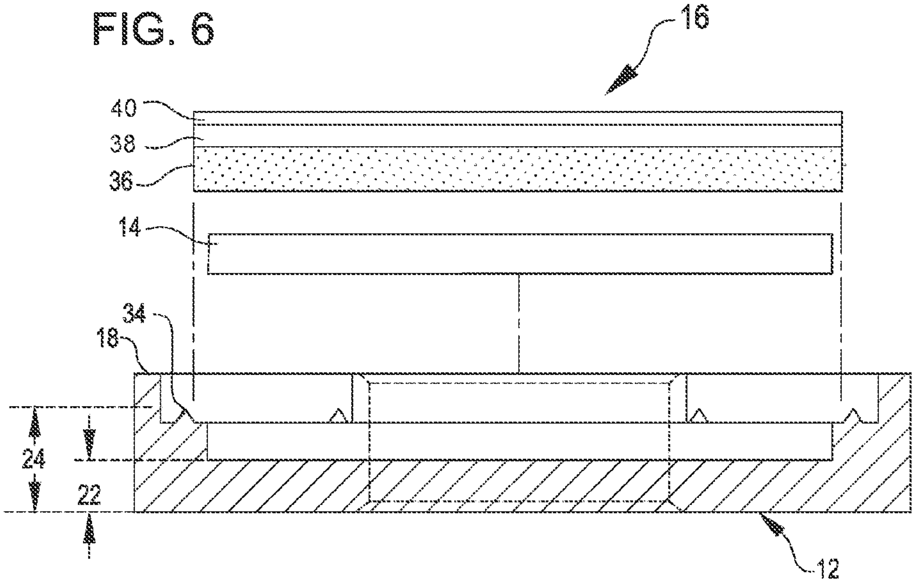
FIG. 6 is an exploded cross-sectional view of an embodiment of the security badge of FIG. 1.

FIG. 6 is an exploded cross-sectional view of components of the security badge 10. The thinner area 22 of the base member 12 is sized to accommodate the RFID card 14. The thicker area 24 extends around the perimeter of the thinner area 22 and provides support for the perimeter of the front panel 16. The perimeter welding element 34 extends around the front panel 16 and is configured for selective welding of the base member 12 to the base layer 36 of the front panel, thereby avoiding welding induced alteration of the perimeter portion of any image data marked on the laser-markable layer 40.

Figure 7:
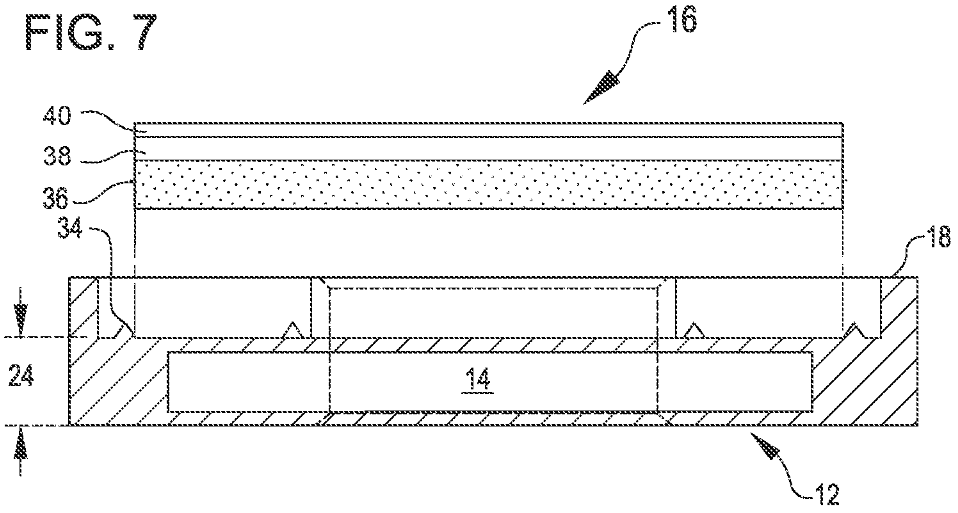
FIG. 7 is an exploded cross-sectional view of another embodiment of the security badge of FIG. 1.

FIG. 7 shows another embodiment of the security badge 10. In the embodiment shown in FIG. 7, the RFID card 14 is molded into the base member 12.

Figure 8:
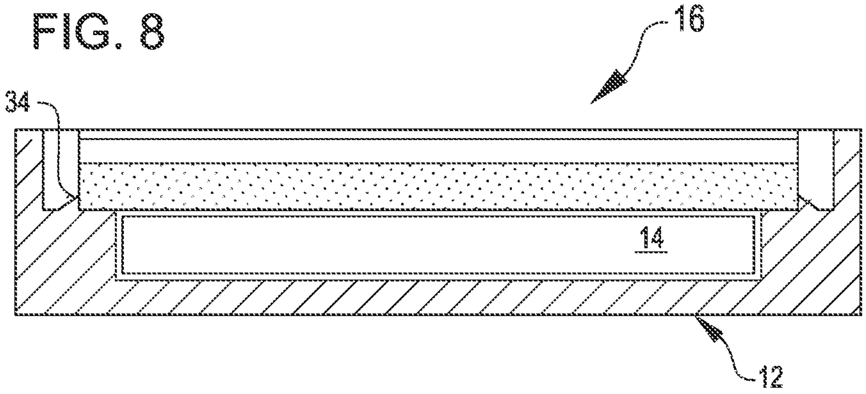
FIG. 8 is a cross-sectional view of the security badge of FIG. 1.

FIG. 8 is a cross-sectional view of the security badge 10 with the RFID card 14 and the front panel 16 assembled together and subsequent to ultrasonic welding of the perimeter welding element 34 and the base layer 36 of the front panel 16. Any suitable equipment (e.g., a 20 KHz (Branson) ultrasonic welder (Series 900, 2000 Watt); tuned, titanium weld horn (Branson P/N 401-001-021); Branson black booster (2.5 gain); and custom ultrasonic nest) can be used to weld the perimeter welding element 34 and the base layer 36 of the front panel 16.

Figure 9:
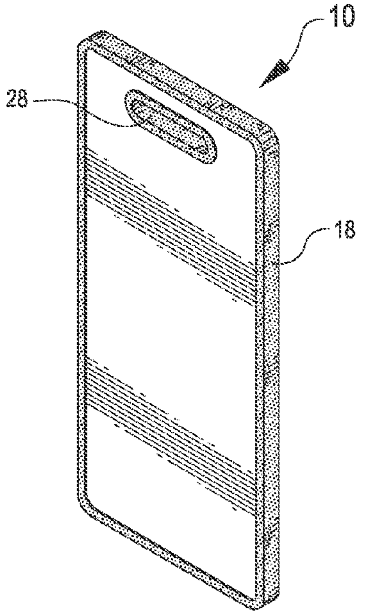
FIG. 9 shows an assembled security badge of FIG. 1.

FIG. 9 shows an assembled security badge 10 prior to laser marking. The illustrated security badge 10, the front panel 16 includes a laser-markable layer 40 that is white in its unmarked form and is opaque such that the base layer 36 cannot be seen through the laser-markable layer 40. In the illustrated security badge 10, the laser-markable layer 40 includes a white layer and a clear laser-markable layer above it. The clear laser-markable layer turns black when exposed to laser energy. As can be seen, the perimeter wall 18 and the aperture wall 28 portions of the base member 12 are visible from a distance when the back surface of the base member 12 is not. Each security badge 10 can have a base member 12 having a color(s) selected from a suitable plurality of colors. An employee can be assigned a security badge 10 having a base member 12 with a particular color(s) to denote any suitable attribute of the employee (e.g., tenure, clearance, employment group, etc.).

Figure 10:
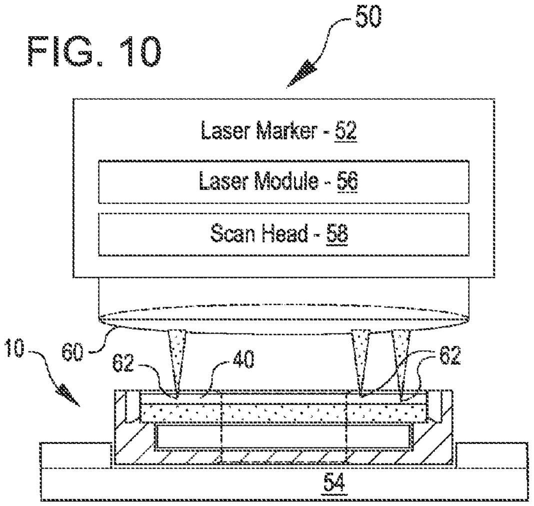
FIG. 10 schematically illustrates a system for laser-marking an image onto a security badge, in accordance with many embodiments.

FIG. 10 schematically illustrates a system 50 for laser-marking an image onto the security badge 10. The system 50 includes a laser marker 52 and a holding fixture 54. The holding fixture 54 holds the security badge 10 during laser marking of the laser-markable layer 40 of the security badge 10. In many embodiments, the laser marker 52 includes a laser module 56, a scanning head 58, and a focus lens 60. The laser module 56 can include any suitable types of laser suitable for marking the material used for the laser-markable layer 40. For example, when polycarbonate is used for the laser-markable layer 40, suitable laser types can include an infrared laser (e.g., Vanadate Nd: YVO4 Laser: 1064 nm, Diode-pumped, Output power typically 8-12 Watt, Pulse duration typically 30-60 ns—Laser Manufactures/Series—Rofin "E", Coherent "Matrix" and Spectra Physics "Explorer") or a near infrared laser (e.g., Ytterbium Q-Switched Pulse Fiber Laser, Output power typically 10-20 Watt, pulse duration 100-120 ns; Ytterbium MOPA Fiber Laser, Output power 20 Watt, selectable pulse duration 4, 8, 14, 20, 30, 50, 100, and 200 ns; Laser Manufacturer: IPG Photonics—YLP & YLPM series). Any suitable scanning head 58 can be used (e.g., ScanLab SCANcube Scan Head). Any suitable focus lens 60 can be used (e.g., Linos Telecentric F-Theta-Ronar lens(es) 160/163 mm). In many embodiments, the laser marker 52 is controllable to scan a focal point 62 of the laser beam output by the laser marker 52 in two or three dimensions within the laser-markable layer 40. In many embodiments, the laser marker 52 is configured to mark an image in the laser-markable layer 40 via a reverse print process.

Figure 11:
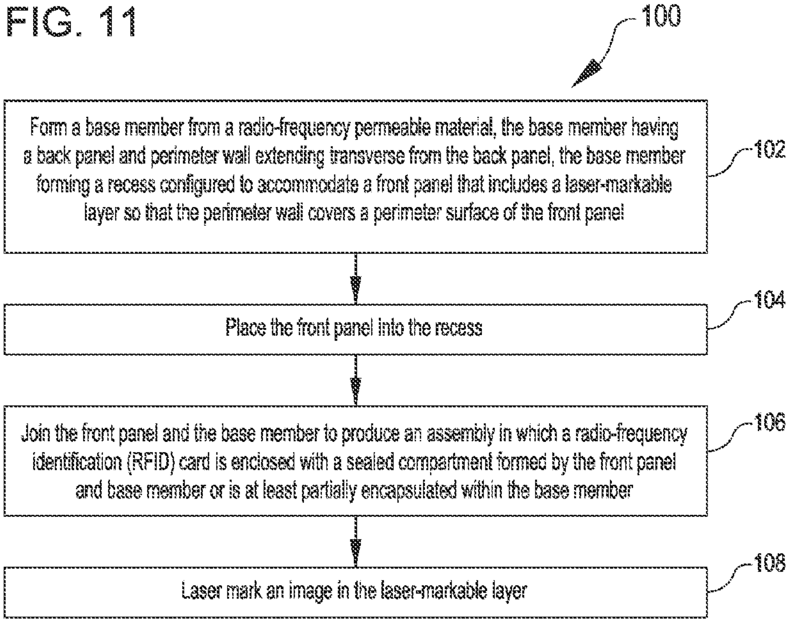
FIG. 11 is a simplified schematic diagram of acts of a method for manufacturing a security badge, in accordance with many embodiments.

FIG. 11 is a simplified schematic diagram of acts of a process 100 for manufacturing a security badge, such as the security badge 10. Any of the details and/or acts discussed herein with respect to the security badge 10 can be used to practice the process 100. Some or all of the process 100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The process 100 includes forming a base member from a radio-frequency permeable material (act 102). The base member has a back panel and a perimeter wall extending transverse from the back panel. The base member forms a recess configured to accommodate a front panel that includes a laser-markable layer so that the perimeter wall covers a perimeter surface of the front panel. The method includes placing the front panel into the recess (act 104). The method includes joining the front panel and the base member to produce an assembly in which a radio-frequency identification (RFID) card configured to transmit an identification number is enclosed within a sealed compartment formed by the front panel and the base member or is at least partially encapsulated within the base member (act 106). And the method includes laser marking an image in the laser-markable layer (act 108).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A security badge, comprising:

a radio-frequency identification (RFID) card configured to transmit an employee identification number;

a front member including a bottom layer, a transparent top layer, and a laser-markable layer disposed between the bottom layer and the transparent top layer;

a base member;

a recess defined by at least one of the base member and the front member;

a perimeter wall extending from at least one of the base member and the front member; and a weld connecting the base member and the front member to form a sealed interior compartment in which the RFID card is disposed.

2. The security badge of claim 1, wherein the perimeter wall forms a recess configured to accommodate at least a portion of the RFID card.

3. The security badge of claim 2, wherein the front member and the base member together define an aperture.

4. The security badge of claim 1, wherein:

each of the base member and the front member comprises a polycarbonate material; and the weld is formed via ultrasonic welding.

5. A security badge, comprising:

a radio-frequency identification (RFID) card configured to transmit an employee identification number;

a front member including a laser-markable layer and a bottom layer disposed under the laser-markable layer, the bottom layer including a polycarbonate material;

a base member having a back panel, the base member including a polycarbonate material;

a recess defined by at least one of the base member and the front member;

a perimeter wall extending from at least one of the base member and the front member; and a weld connecting the base member and the front member, wherein the front member, the base member, and the weld together form a sealed interior compartment in which the RFID card is disposed.

6. The security badge of claim 5, wherein the RFID card is configured to be read at each of two different frequencies.

7. The security badge of claim 5, wherein the front member further comprises a laser-marked image, the laser-marked image comprising a greyscale image marked in the laser-markable layer via a reverse-print process.

8. The security badge of claim 5, wherein the base member forms a recess accommodating the RFID card and the front member.

9. The security badge of claim 5, wherein the base member defines a base member aperture configured to interface with a lanyard to suspend the security badge from the lanyard.

10. The security badge of claim 9, wherein the front member defines a front member aperture configured to accommodate a portion of the base member that defines a portion of the base member aperture.

11. The security badge of claim 5, wherein the weld is formed vis ultrasonic welding.

12. The security badge of claim 5, wherein the base member has a color denoting an attribute of the security badge, the color being selected from a plurality of different colors.

13. A method for manufacturing an identification device comprising a radio-frequency identification (RFID) card configured to transmit an identification number, a base member having a back panel, a front member having a front panel that includes a laser-markable layer, and a recess defined by at least one of the base member and the front member, the front member including a bottom layer formed from a polycarbonate material, the method comprising:

forming the base member by molding the base member from a polycarbonate material;

positioning the base member;

positioning the RFID card;

positioning the front member; and welding the front member and the base member to form a sealed compartment within which the RFID card is disposed by ultrasonically welding a perimeter portion of the bottom layer of the front member to a perimeter portion of the base member.

14. The method of claim 13, further comprising a step of laser marking an image in the laser-markable layer.

15. The method of claim 14, wherein the step of laser marking includes reverse-printing.

16. The method of claim 13, wherein the step of positioning the RFID card comprises positioning the RFID card in a recess defined by the base member.

17. The method of claim 13, comprising a step of forming an aperture configured to interface with a lanyard to suspend the identification device from the lanyard.

* * * * *